Oct. 31, 1933.    R. A. WARNER    1,933,356
DEMAND METER
Filed Dec. 31, 1932
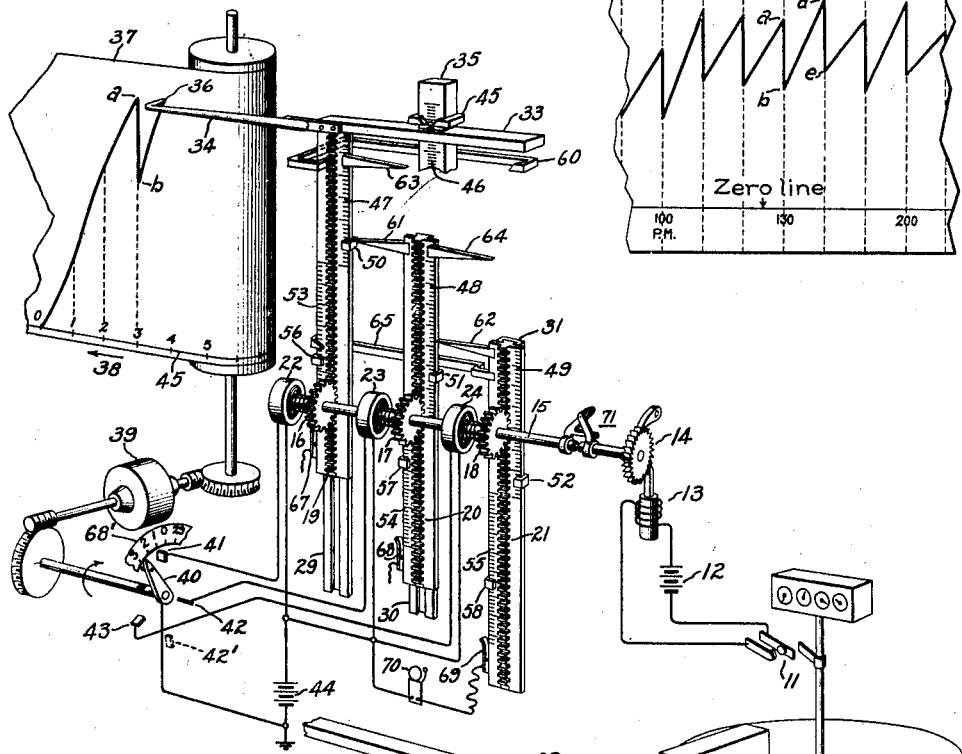
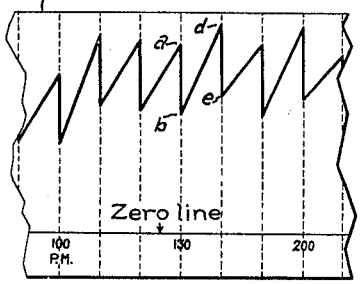
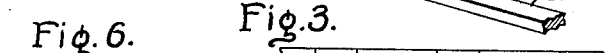
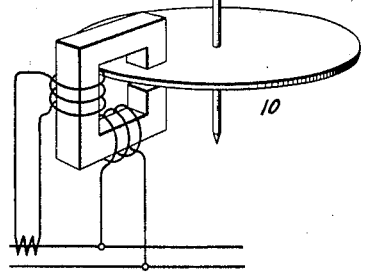
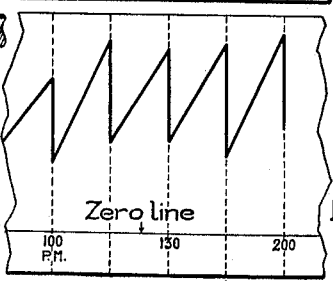
Inventor:
Russell A. Warner,
by Charles V. Mullan
His Attorney.

Patented Oct. 31, 1933

1,933,356

UNITED STATES PATENT OFFICE 1,933,356

DEMAND METER

Russell A. Warner, Schenectady, N. Y., assignor to General Electric Company, a corporation of New York Application December 31, 1932
Serial No. 649,692

13 Claims. (Cl. 234—5.5)

My invention relates to improvements in demand meters, and its primary object is to provide a demand meter which measures the demand over a plurality of time intervals of different duration and over overlapping time intervals of the same duration in a simple manner. To more clearly illustrate the object of my invention, let us assume by way of example that we have a known form of demand meter which measures the demand over consecutive 30 minute intervals. By means of my invention such a demand meter may be modified in a relatively simple way to measure not only the demand over consecutive 30 minute intervals, but also to measure the 30 minute demand over overlapping time intervals such that the measurement is completed every ten minutes for example, and at the same time making available demand measurement over consecutive ten minute intervals and over ten minute overlapping 20 minute intervals. Thus, a meter so arranged according to my invention would measure the 30 minute interval demand, the 20 minute interval demand, and the 10 minute interval demand every 10 minutes. These measurements may all be recorded by the same device and the apparatus may be provided with registers for indicating the maximum demands that have occurred over the 10, 20 and 30 minute intervals during a period of a month, or any other period of time that is selected for ratemaking purposes. Other objects and advantages of the invention will appear as the description proceeds.

The features of my invention which are believed to be novel and patentable will be pointed out in the claims appended hereto. For a better understanding of my invention, reference is made in the following description to the accompanying drawing, showing in Fig. 1 a perspective view of the essential parts of a demand meter embodying my invention as arranged to give the measurements referred to in the example previously mentioned. Fig. 2 shows the form of record obtained with the apparatus of Fig. 1, the significance of which will be explained hereinafter. Figs. 3 and 4 are other forms of records that may be made using only a part of the apparatus of Fig. 1. Fig. 5 is a detail sectional view of one of the rack release relays employed in the apparatus of Fig. 1, and Fig. 6 is an end view of one of the guided racks used in the apparatus of Fig. 1.

Referring to Fig. 1, there is represented at 10 a watthour meter provided with a contact device 11 arranged to transmit electric impulses in accordance with the rate of rotation of the meter, as is common in the impulse metering art. It will be understood that so far as the present invention is concerned the meter represented at 10 might be a gas meter, a water meter, or a meter for measuring any other quantity the demand of which is desired to measure. The impulses resulting from the rotation of the meter are supplied from a source indicated at 12 and actuate a ratchet relay 13 located at any desired distance from the meter 10. The ratchet relay when energized in response to the reception of impulses, rotates the ratchet wheel 14 of my demand meter step by step, and it will be evident that the shaft 15 rotated by the ratchet wheel will have an average rotational movement directly proportional to the rate of rotation of the meter 10. Any other suitable arrangement for directly or indirectly rotating shaft 15 in accordance with a metered quantity the demand of which is to be measured might be used.

In the example given, the shaft 15 rotates three gear wheels 16, 17 and 18 in a direction to lift light weight racks 19, 20 and 21 when the gear wheels are in mesh therewith. The gear wheels, however, are slidable along the shaft so as to be disengaged from the racks by means of magnetic disengaging devices 22, 23 and 24 when the latter are energized.

One of the magnetic disengaging means is more clearly illustrated in Fig. 5, where it is noted that the gear wheel 16 is splined on shaft 15 to rotate therewith, but may be slid to the left out of mesh with rack 19. The gear 16 and shaft 15 are made of magnetic material and the cup-shaped housing 22 is likewise of magnetic material. Consequently, when the coil 25 which surrounds the shaft within the cup 22 is energized, the gear 16 is drawn to the left by magnetic attraction to substantially close the magnetic circuit as indicated by the dotted line position of the gear wheel in Fig. 5, the gear acting as an armature over the open end of the cup. When coil 25 is deenergized, a spring 26 returns the gear 16 to the full line position shown, in mesh with the rack 19. The spring 26 and gear 16 are mounted between two collars 27 and 28 on shaft 15 as represented. The housing 22 and its coil 26 preferably do not rotate with shaft 15. The number of teeth in gear wheels 16, 17 and 18 is preferably the same as the number of teeth in the ratchet wheel 14.

The three movable members or racks 19, 20 and 21 are guided to move or be advanced in parallel paths in vertical directions by guides 29, 30 and 31; an upper end view of a rack and guide being shown in Fig. 6. When the gear wheels are disengaged from their racks, the latter are reset to zero positions and drop by gravity so that their bottom ends rest upon a stop bar 32, the latter being preferably made of some shock absorbing material. These latter positions are the zero or initial positions of the racks to which they are reset at the end of one and the beginning of the next demand meter intervals, as will presently be explained.

In order to prevent the loss of the measurement value of an impulse in case an impulse should be received on ratchet wheel 14 at the instant a gear such as 16 is disengaged from its rack, I prefer to provide a resilient coupling in shaft 15 as represented at 71. Normally the two parts of the shaft 15 on opposite sides of this coupling rotate together. However, if an impulse is received at the instant a gear such as 16 is attracted to the magnet 22, the latter prevents the adjacent portion of shaft 15 from rotating until the gear is released by the magnet and is again meshed with its rack. In the meantime, the measurement value of any received impulse is momentarily stored in the resilient coupling 71 and is conveyed to all of the racks as soon as the rack resetting operation is completed.

In alignment with the upper ends of the racks is a recording bar 33 which carries a recording arm 34. Bar 33 slides up and down on suitable guiding means represented at 35 in accordance with the vertical movements of the racks 19, 20 and 21, the vertical position of bar 33 being determined by that rack which is furthest from its zero position at any instant. Its position is indicated on a scale 46 in terms of demand measurement. It will be understood that bar 33 may contain a rectangular shaped opening in which is carefully fitted the guide 35 so that bar 33 is kept in a true horizontal position in alignment with the upper ends of the rack. The present representation is more to illustrate the principle involved in a simple manner, rather than an attempt to represent a mechanically perfect arrangement. However, it will be understood that the bar 33 to which the recording stylus arm 34 is attached is arranged to prevent its being tipped or skewed from a true horizontal position as it moves up and down on its guide, in order that accurate records may be made. The bar 33 drops by gravity when the rack supporting it is lowered, until the downward movement is arrested by contact with one of the other racks.

The stylus arm 34 is provided with any suitable stylus 36 which marks upon a suitable record sheet 37. The record sheet 37 is moved, preferably at a uniform rate, in the direction indicated by arrow 38 by a constant speed motor device represented at 39. The some motor or clock device is here used to operate a contact arm 40 which makes momentary contact with the uniformly spaced stationary contact devices 41, 42 and 43. It will be noted that the three stationary contacts are respectively connected in circuit with the three magnetic rack disengaging relays 22, 23 and 24 and with a source of supply 44 and the contact on rotatable arm 40. Thus, it will be seen that the release devices 22, 23 and 24 will be momentarily energized and that their corresponding racks 19, 20 and 21 will be momentarily disengaged or released from drive shaft 15 at different times in rotation, the time intervals between all consecutive releasing operations being uniform, due to the uniform speed of the clock motor 39 and the uniform spacing of the stationary contacts 41, 42 and 43.

If, now, arm 40 is geared to motor 39 so as to make one revolution in thirty minutes, the three racks will each be in driving engagement with shaft 15 for different evenly spaced, overlapping thirty minute or other selected predetermined time intervals of equal duration, and they will be released ten minutes apart. It will be understood that the duration of contact closure by arm 40 will be adjusted to be only long enough for a rack to be reset to its zero position, and that it will be engaged again almost instantly after it reaches its zero or initial position. A timing scale 68' is preferably provided back of arm 40 so that the exact time position of arm 40 with respect to a contact point may be seen.

To explain the operation of the demand meter as thus far described, it will be assumed that the apparatus as represented in Fig. 1 has been in operation about thirty-seven minutes. Also that in starting the apparatus into operation all of the movable members 19, 20 and 21 were in their zero positions with their lower ends resting upon bar 22. The recording bar 33 was, therefore, in its lowest position with its stylus 36 on the zero line 45 of the record sheet 37. The graduations marked on the zero line of the record sheet represent ten-minute intervals, but for convenience they are here marked 0, 1, 2, 3, 4, etc. The apparatus was thus started into operation when the stylus 36 was at the point 0 and contact arm 40 had just broken contact at the stationary contact 43. The nature of the record indicates that the meter 10 had been operating at a fairly uniform rate close to the maximum speed for which the apparatus is adjusted over the thirty-seven minute period under consideration.

Over the ten-minute interval corresponding to the period marked 0 to 1 on the record sheet, the three racks 19, 20 and 21 were advanced upward together all at the same level in accordance with the demand being measured. At the end of this first ten-minute interval, arm 40 made contact at 41 and released rack 19, which accordingly dropped to its initial zero position against stop bar 32. However, racks 20 and 21 continued to rise and to lift the recording bar 33 so that there is no disturbance in the record traced by the stylus 36 at this time. The arm 40 moved off contact 41 and rack 19 was again advanced upward, but at a lower level than racks 20 and 21. When arm 40 made contact at 42 at the time corresponding to time graduation 2 on the record sheet, rack 20 was released and dropped to zero and was again engaged and moved upward, but at a lower level than rack 19. Bar 33 was still moved upward by rack 21. At the end of the first thirty-minute demand interval corresponding to 3 on the record sheet, arm 40 came to contact 43, rack 21 was released and dropped to the zero position. Recording bar 33 also dropped with rack 21 until it rested upon rising rack 19, thereby drawing the vertical part of the record *a b*. Rack 21 was again engaged and moved upward. Rack 19 moving up now lifts recording bar 33 to make the record from *b* to the point of the stylus 36, which brings us to the end of the thirty-seven minute period under consideration. At this time the parts are in the positions represented in Fig. 1, and shortly 40 will again make contact at 41, rack 19 will drop to the zero position, and bar 33 will drop onto the rising rack 20.

It will be evident that 3—*a* is the demand measurement over the thirty minute time interval 0—3, and corresponds to the distance rack 21 was advanced upward by shaft 15 during that interval. It will also be evident that 3—*b* is the demand measurment over the twenty minute interval 1—3, and corresponds to the distance rack 19 was moved upward by shaft 21 during that particular twenty minute interval, because it started from its 0 position at time 1 and reached a height $b$ at time 3. Since 3—$a$ is the demand over time 0—3, and 3—$b$ is the demand over time 1—3, it follows that the difference in these demand measurements, or $a$—$b$ is the demand over the ten-minute interval 0—1. The nature of the record thus produced may be represented in Fig. 2, from which we may obtain the thirty-minute demand, twenty-minute demand, and the ten-minute demand at the end of any and every ten-minute interval. Thus, in Fig. 2 $a$—$b$ and $d$—$e$ are the ten-minute interval demand records from 1:00 to 1:10 P. M., and from 1:10 to 1:20 P. M., respectively. 0—$b$ and 0—$e$ (0 representing the zero line) are the twenty-minute interval demand records from 1:10 to 1:30 P. M., and from 1:20 to 1:40 P. M., respectively, and 0—$a$ and 0—$d$ are the thirty-minute interval demands from 1:00 to 1:30 P. M., and from 1:10 to 1:40 P. M., respectively. It will, of course, be appreciated that the ten-, twenty-, and thirty-minute intervals above referred to are given merely by way of example, and that any other suitable time intervals, such as sixty, forty and twenty minutes, might be used.

If, now, we omit one of the racks 21 and its corresponding control devices 43, 24 and 18 and make a new record over the same time period and with the same load as recorded in Fig. 2, we will obtain the record shown in Fig. 3. Here, 0—$b$, 0—$a$, 0—$d$ have exactly the same significance as in Fig. 3. 0—$f$ is a ten-minute interval demand record and $d$—$f$ a twenty-minute interval demand record. We may thus simplify the apparatus and still obtain ten-, twenty-, and thirty-minute demand records, but not over every ten-minute interval.

If one of the racks 21 of Fig. 1 is to be omitted, it may be preferable to divide the thirty-minute interval into two fifteen-minute intervals by shifting contact 42 diametrically opposite contact 41 as indicated at 42'. Then the apparatus will measure the thirty-minute interval demands and the fifteen-minute interval demands every fifteen minutes to produce a record such as is represented in Fig. 4. Thus the number of racks or movable members may vary and we may designate the number by $n$.

It will be recognized that if we omit any two of the racks shown in the apparatus of Fig. 1, we will have left apparatus which is similar in principle and in operation to a very common form of demand meter for measuring the demand over consecutive time intervals. See, for example, United States Patent No. 1,217,301, Hall, February 27, 1917.

From the foregoing description it will be apparent that by relatively simple addition to such a demand meter a vastly greater amount of demand measurement information may be obtained.

In usual rate-making practices it is desirable to take into consideration the maximum demand that has occurred over a period of a month. By a laborious study this could be obtained from the record, but the apparatus of Fig. 1 may be provided with simple maximum demand indicators to register the maximum demand over any ten-, twenty-, and thirty-minute time intervals during a month or other rate-making period.

Such an indicator for the thirty-minute demand is provided at 45, and comprises a light friction slider on guide 35. The front side of the guide is provided with a thirty-minute maximum demand scale 46. Slider 45 is moved up this scale by recording bar 33, and when bar 33 drops slider 45 remains in the elevated position, due to friction. It will thus be evident that if at the beginning of a monthly period slider 45 is moved down into contact with recording bar 33, then at the end of such period the slider will indicate the maximum thirty-minute interval demand that has occurred during such period. The bottom edge of slide 45 and the top edge of bar 33 both indicate on scale 46 and show the maximum demand and the current demand measurements respectively.

The racks 19, 29 and 21 are each provided with ten-minute interval demand scales 47, 48 and 49 having maximum demand slide indicators 50, 51 and 52, and with twenty-minute interval demand scales 53, 54 and 55 having maximum demand slide indicators 56, 57 and 58 respectively. These slide indicators may comprise light spring clasps which slide freely in grooves 59 (see Fig. 6) but which have sufficient friction to stay at any point to which moved and not be displaced by inertia incident to the dropping of a rack against the stop bar 32. In Fig. 6, the ten-minute interval slide 50 is shown removed from the rack 19, and the twenty-minute interval slide is represented in place.

All of the demand scales on the movable racks are graduated from 0 or appropriate minimum values downward, and demand indicating pointers which also serve to move the sliders are provided on the racks which move relative to the scales on which they cooperate in the manner to indicate the demand values desired, as will now be explained.

The ten-minute interval demand pointers on racks 19, 20 and 21 are represented by reference characters 60, 61 and 62, and cooperate with scales 49, 47 and 48, respectively, on racks 21, 19 and 20, respectively. Pointer 60 preferably extends around the back of the central guide rack 35 in order not to obstruct the view of the other demand scales and pointers, and in such a way as not to interfere with the relative movements of the different racks. Since rack 19 starts its upward movement from a zero position ten minutes previous to rack 20, it will be apparent that pointer 61 will indicate the corresponding ten-minute interval demand on scale 47, and the maximum of such ten-minute interval demands, (for this particular indicator set) which has occurred since slider 50 has been reset toward the zero position will be indicated by the upper edge of such slider on the scale 47. The demand measurements thus made are for time intervals corresponding to the difference in the times the two racks are returned to zero positions. Similarly, pointer 62 indicates the existing ten-minute interval demand on scale 48, and slider 51 indicates the maximum ten-minute interval demand for this set. Similarly, pointer 60, moved by rack 19, will indicate on scale 49 the ten-minute interval demand now being measured as soon as the measurement is completed and rack 19 drops to zero, and slide 52 the maximum of such demands for this indicator set. Then the maximum ten-minute interval demand for the apparatus will be the greatest indication found by comparing the readings of sliders 50, 51 and 52.

The twenty-minute interval demand pointers on racks 19, 20 and 21 are represented respectively by reference characters 63, 64 and 65, and cooperate respectively with scales 54, 55 and 53 on racks 20, 21 and 19. Pointer 65 is preferably carried around to the rear of the guides 30 and 29 but in front of guide 35 to avoid obscuring the view of the other parts and interference with the required movements. The indicating end of pointer 65 passes within the bend of pointer 60 adjacent where the latter is fastened to rack 19 so as to clear when the two pass each other.

Since rack 21 starts to move upward twenty minutes after rack 19, pointer 65 will indicate the demand over the corresponding time interval on scale 53, and slider 56 will be moved downward on the scale in accordance with the maximum of such indications. It is less confusing if the zero end of the twenty-minute demand scales be left ungraduated, since we are not interested in twenty-minute demand readings below a certain amount. It is believed that it will be unnecessary to further describe the other twenty-minute interval demand scales and pointers, since they are used in a similar way to that already described. The twenty-minute demand measurement about to be completed will appear at the end of pointer 63 on scale 54 when rack 19 drops to zero. The maximum twenty-minute interval demand for the apparatus will be found by comparing the indicators 56, 57 and 58 and using the greatest registration.

The demand indicators on the racks which show the relative positions of the racks in terms of demand measurements have a very useful function in addition to registering the ten- and twenty-minute maximum demands, by reason of the fact that they give a fairly approximate picture of what the next thirty-minute demand is going to be in time for an operator to adjust his load condition to prevent exceeding some undesirable maximum demand load value which has not yet been exceeded during the rate making period. It will be noted, for example, that pointers 61 and 62 show the next two ten-minute interval demands that will be recorded, and that pointer 65 indicates their sum. The operator, therefore, has an exact picture of what the load conditions were over the first two-thirds of any thirty-minute demand interval all during the last one-third of that interval. In other words, the demand measurements over definite fractional parts of a time interval are available as the measurement over the whole time interval accumulates. By the relative values indicated on scales 47 and 48 the operator can obtain an idea of whether the load is increasing or decreasing. He can see at a glance by the relative positions of bar 33 and slider 45 how much load may be carried during the remainder of the thirty-minute interval to avoid exceeding the maximum thirty-minute interval demand indicated by 45, and he can tell from the position of arm 40 on scale 68' how much time is left during the demand period under consideration.

In addition, I may provide alarm or control contacts 67, 68 and 69 on the twenty-minute demand scales near the maximum indicating points thereof, so arranged as to be closed by movement of the slides 56, 57 or 58 into contact therewith to sound an alarm 70 to notify the operator of any selected excessive twenty-minute interval demand as soon as it has occurred prior to the expiration of the thirty-minute interval of which the twenty-minute interval is a predetermined fractional part. To avoid further complicating the drawing, only the alarm circuit for contact 69 has been indicated. When slide 58 reaches contact 69, the contact is grounded to the metal rack and closes a circuit through battery 44, which also has one side grounded to the metal structure of the apparatus.

From the foregoing description, it is seen that I have provided a relatively simple demand meter which gives a large amount of detail information relative to the demand of the load which is metered thereby. The mechanism for carrying out the invention and its details of construction may be modified considerably from those described, and, consequently, I do not wish to be limited to the particular mechanism or details described, but seek claims commensurate with its true spirit and scope of the invention.

What I claim as new and desire to secure by Letters Patent of the United States, is:

1. A demand meter comprising a plurality of movable members moved in one direction from zero positions in response to the demand to be measured, means whereby said members are quickly returned to their zero positions at the end of predetermined evenly spaced different time intervals of equal duration, means operated by that movable member farthest from the zero position at any instant for indicating the demand over each of such predetermined time intervals, and means for indicating the differences of said movable members from their zero positions in terms of demand over lesser time intervals corresponding to the difference between the times when said members are returned to their zero positions.

2. A demand meter comprising $n$ movable members moved from zero positions in response to the demand to be measured over predetermined equal time intervals, means for quickly returning said members to their zero positions at different evenly spaced times in rotation, the interval between any two consecutive zero return operations being $1/n$ of one of said predetermined time intervals, means operated by that movable member which is farthest from its zero position at any instant for measuring the demand over each of such predetermined time intervals, and means controlled by the relative positions of said movable members for indicating the demand measured over each $1/n$ of each such predetermined time interval as the demand measurement over the whole of such time interval accumulates.

3. A demand meter comprising a plurality of movable members having a common zero position, means operated in response to the demand to be measured for advancing said members in a given direction from said zero position over different, equally overlapping time intervals of equal duration, means for quickly returning said members to their zero position at the ends of said time intervals in rotation, means controlled by said movable members for measuring the demand over each of said time intervals, and means controlled by the joint action of said movable members for measuring the demand over lesser time intervals corresponding to the difference in the times that any two of said members are returned to their zero position.

4. A demand meter comprising three movable members, means for advancing said members from a common zero position in response to the demand to be measured over equal but different, evenly overlapping time intervals, means for quickly returning said members to their zero position at the ends of said time intervals in rotation, and means operated thereby for measuring the demand over each of said time intervals, over each 1/3 and over each 2/3 of each of said time intervals.

5. A demand meter comprising a plurality of movable members, means for advancing said members in parallel paths from zero positions over equally overlapping time intervals of the same duration in accordance with the demand to be measured, means for returning said movable members to their zero positions at the ends of said time intervals in rotation, graduated scales and pointers on each of said movable members, the pointer on any given member cooperating with a scale on a different member, said scales and pointers serving to indicate the relative positions of said movable members in terms of demand measurements over time periods corresponding to the difference between the times said members are returned to zero positions.

6. A demand meter comprising a plurality of movable members, means for advancing said members from zero positions in accordance with the demand to be measured over different, evenly overlapping predetermined time intervals of equal duration, means for returning said members to zero positions at the ends of said time intervals in rotation, means for indicating the maximum demand measured by any one of said movable members over any of such predetermined time intervals, and means controlled jointly by the relative movement of said members for measuring and indicating the maximum demand measured over lesser time intervals corresponding to the difference between the times that any two of said members are returned to their zero positions.

7. A demand meter comprising a plurality of movable members, means for advancing said members from zero positions in accordance with the demand to be measured, over evenly spaced, equally overlapping predetermined time intervals, means for resetting said members to their zero positions at the ends of such time intervals in rotation, whereby the demand measurements for such predetermined time intervals are obtained over corresponding overlapping time intervals, means operated by the relative movement of the different members for indicating the demand measured over definite fractional parts of said predetermined time intervals as the demand measurement over the whole of such time intervals accumulates, and circuit control means cooperating with said last mentioned means operated in response to a selected excessive demand measurement over a predetermined fractional part of a predetermined time interval prior to the expiration of such predetermined time interval.

8. A demand meter for measuring demand over equally overlapping time intervals of predetermined duration, comprising a plurality of separate movable members each advanced from a zero position in response to the demand to be measured and reset to zero at different times in rotation, and circuit controlling means operated by the relative movement of said members in response to a predetermined excessive demand measurement made over a definite fraction of a complete demand interval prior to the completion of said demand interval.

9. A recording demand meter comprising a chart, timing means for advancing said chart, a stylus marking upon said chart, three movable members each advanced from a zero position in response to the demand to be measured over equally overlapping time intervals of predetermined duration, means for resetting said members to zero position in rotation at the ends of said intervals, and means whereby the member farthest from its zero position at any instant controls the movement of said stylus to produce records of demand over each of said overlapping time intervals, over each 1/3 and over each 2/3 of said time intervals.

10. A demand recording meter comprising three movable members, means for advancing said members from a zero position over equally overlapping predetermined time intervals of equal duration in response to the demand to be measured, means for returning said members to the zero position at the ends of said time intervals in rotation, a chart, timing means for advancing said chart, a stylus marking on said chart and movable transversely of said chart by the aforesaid movable members such that the position of the stylus is determined by that movable member which is farthest from its zero position at any instant, whereby said stylus is caused to record the demand over a complete predetermined time interval, over the first 1/3 of the same time interval and over the last 2/3 of the same time interval at the end of each such predetermined time interval.

11. A recording demand meter comprising a time advanced chart, a stylus movable transversely to said chart, a plurality of movable members for controlling the movement of said stylus, means for advancing said members from a zero position over equally overlapping time intervals of equal duration in response to the demand to be measured, means for resetting said members to zero at the ends of said time intervals in rotation, the member which is farthest from its zero position at any instant determining the position of said stylus, said apparatus serving to record the demands over said time intervals and over different fractional portions thereof corresponding to the difference in the times said members are returned to zero positions, and means operated by said movable members for otherwise registering the maximum of the demand measurements so recorded.

12. Demand meter apparatus for measuring and indicating an electric supply, comprising an integrating supply meter and a plurality of indicating devices driven in response to the integration of said meter over different periods of time to indicate the greatest amount of integration of said meter during any one of a number of time intervals of one duration and during any one of a number of time intervals of a different duration.

13. In a demand meter, a periodically reset movable member, a rotary shaft for advancing said movable member, disengageable driving means between said shaft and member, means for momentarily disengaging said driving means and simultaneously locking the shaft against rotation while thus disengaged, means for normally driving said shaft in accordance with the demand to be measured, and a resilient driving coupling between said last mentioned driving means and shaft wherein energy, which would otherwise cause the rotation of said shaft, may be momentarily stored during the time the shaft is held stationary, to subsequently drive said shaft when released.

RUSSELL A. WARNER.